United States Patent [19]

Stevens

[11] Patent Number: 5,590,281
[45] Date of Patent: Dec. 31, 1996

[54] ASYNCHRONOUS BIDIRECTIONAL APPLICATION PROGRAM PROCESSES INTERFACE FOR A DISTRIBUTED HETEROGENEOUS MULTIPROCESSOR SYSTEM

[75] Inventor: Bruce W. Stevens, North Kingstown, R.I.

[73] Assignee: The United States of Americas as represented by the Secretary of the Navy, Washington, D.C.

[21] Appl. No.: 783,661

[22] Filed: Oct. 28, 1991

[51] Int. Cl.$^6$ ................................................. G06F 15/16
[52] U.S. Cl. .............................. 395/200.01; 395/200.02; 395/200.03; 395/200.1; 395/680
[58] Field of Search ................................. 395/200, 32 S, 395/650, 700, 200.01, 200.02, 200.03, 200.2; 364/228.9, 230, DIG 1

[56] References Cited

U.S. PATENT DOCUMENTS

| | | | |
|---|---|---|---|
| 4,723,208 | 2/1988 | Chadima et al. | 364/200 |
| 4,949,254 | 8/1990 | Shorter | 364/200 |
| 4,969,092 | 11/1990 | Shorter | 364/200 |
| 4,991,089 | 2/1991 | Shorter | 364/200 |
| 5,062,037 | 10/1991 | Shorter et al. | 364/200 |
| 5,063,500 | 11/1991 | Shorter et al. | 395/200 |

OTHER PUBLICATIONS

"Standards and Protocols for Communications Networks" by James W. Conard, 1982 Section III.

*Primary Examiner*—Kevin A. Kriess
*Assistant Examiner*—Michael T. Richey
*Attorney, Agent, or Firm*—Michael J. McGowan; Michael F. Oglo; Prithvi C. Lall

[57] ABSTRACT

A network interface resident on one processor enables heterogenous processors interconnected by a common network to exchange control and data information via virtual circuits created and maintained by the network interface between sockets defined at the communicating processors. Different kinds of messages are discriminated and their length is determined to enable the same network virtual circuit to mulitplex data and control information in a manner that is message specific and conserves network resources. Data conversion is implemented to enable heterogeneous processors to communicate over the network virtual circuit. Asynchronous, bidirectional communication is provided by the network interface for tightly-coupled, moderately-coupled, and loosely-coupled hardware architecture conformance types.

14 Claims, 3 Drawing Sheets

ASYNCHRONOUS BIDIRECTIONAL APPLICATION PROGRAM PROCESSES INTERFACE FOR A DISTRIBUTED HETEROGENEOUS MULTIPROCESSOR SYSTEM

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

(1) Field of the Invention

This invention is directed to the field of data processing, and more particularly, to a novel asynchronous bidirectional network interface enabling seamless concurrent processing in a distributed heterogeneous multiprocessor system.

(2) Description of the Prior Art

Distributed computer systems exist in one of three principal architecture conformance types, namely, tightly-coupled multiprocessing systems, moderately-coupled multiprocessing systems, and loosely-coupled multiprocessing systems. The tightly-coupled distributed multiprocessing architecture conformance type is constituted by plural processors connected by either a memory bus or a backplane by which memory is globally shared; the moderately-coupled type is constituted by plural processors interconnected either by a backplane or a single-segment LAN with no global memory and where a standard store-and-forward information transfer mechanism may be employed, while the loosely-coupled distributed multiprocessor architecture conformance type is constituted by plural processors coupled by multisegmented bridged LAN's (Local Area Networks including the transmission line thereof) and full WAN's (Wide Area Networks including the transmission line thereof) with a store-and-forward information transfer mechanism. Local memory may be provided to any processor of any of the multiprocessors of any of the three types of distributed systems. Typical backplanes for the tightly-coupled type advantageously may be the Futurebus+, and the Scalable Coherent Interface (SCI), and typical network standards and protocols for the moderately-coupled and loosely-coupled types may advantageously be the OSI Reference Model, TCP/IP, DECnet and SAFENET networks. Typical processors may advantageously be the MilVAX, MIPS R3000, Intel 80486, Motorola 68030, AMD 29000 and the Intel 88000, among others.

In order to utilize the full processing potential of any one of the distributed multiprocessing architecture conformance types, provision must be made to accommodate heterogeneous machines, namely, machines that may differ in data representation, instruction sets and/or architecture, among other things. For the tightly-coupled multiprocessor systems, where all of the processors have access to global memory attached to the common backplane or "bus", and where it is possible for all of the processors to share data by placing it in a mutually agreed upon address in global memory, heterogeneous multiple processor configurations introduce a number of complications. Whenever the processors are not alike, it becomes difficult to develop a compiler, such as an Ada compiler, and supporting runtimes across the entire suite of processors. In fact, there are a limited number of compiler vendors which produce a single compiler that targets a number of different processors. In those cases where a single compiler does target a number of different processors, the runtimes for each targeted processor are unique and usually do not incorporate the necessary mechanisms to interoperate such as support for heterogeneous cross-processor rendezvous. The problem of data representation at the machine level further complicates matters. One cannot simply share global data in commonly addressable memory without consideration of the cooperating target processors. Byte ordering between processors, for example, may differ; for instance, the VAX is a "little endian" (i.e., 0 byte being low order) processor while the other above-named exemplary processors are configured as "big endian" (i.e., 0 byte being high order) processors. If the intent is to have data shared in commonly addressable memory, the data producing processor, or the data consuming processor, or both, would have the responsibility of converting the data. Mechanisms such as the SUN external Data Representation (XDR), ISO's Abstract Syntax Notation 1 (ASN.1) or a unique conversion process could be used to convert the data from one processor's representation to the other processor's representation, or to a mutually agreed upon neutral representation. This, however, requires shadowing the global data with a similar data structure in the agreed upon representation, undesirably multiplying the memory requirement for sharing data by the number of processors requiring different representations. Another disadvantage would result from an effort to make all of these presentation issues invisible, which would require extensive modification to the runtime, such as an Ada runtime. And along with the invisibility would come questions from the system's designer of what effect the associated overhead would have on performance. When building a large embedded distributed system, the system designer does not want to consume time developing or modifying the compiler and/or runtime. Rather, it is the desire of the system designer to implement the application without distractions.

Moderately-coupled systems, like loosely-coupled systems, do not have global memory, so that mechanisms need be employed to share data and synchronize actions through communications protocols over the backplane or single segment LAN. These mechanisms are similar to those that would be necessary on loosely-coupled systems. For the loosely-coupled systems (and moderately-coupled systems) where the processors neither share global memory nor a single interconnect medium (i.e. a common backplane, bus or single segment LAN) but employ store-and-forward mechanisms to share data and to synchronize actions that are implemented through communications protocols, such as the SAFENET1 and SAFENET2 networking standards to be used in future Navy systems, the complications introduced by heterogeneous processors are such as to require the design, development and modification of a compiler, capable of supporting multiple backends and runtime systems which target each of the heterogeneous processors. For each processor of the heterogeneous processors, runtime environments would have to be developed/modified to support the level of desired distribution, which restrictions on the level of distribution would have a large effect on the resulting runtime overhead, since greater flexibility would result in a larger runtime overhead and size. Further, mechanisms within the runtime would be required to support memory management, time management, tasks and exceptions. Other mechanisms would also be needed to support processor interrupts, I/O, predefined packages, generic units, and, among other things, compiler/processor independent/dependent attributes.

There is thus a need to provide a mechanism other than a single compiler capable of supporting plural heterogeneous processors enabling concurrent processing for distributed systems configured in any one of the tightly-coupled, moderately-coupled and loosely-coupled hardware architecture conformance types.

SUMMARY OF THE INVENTION

It is accordingly the principal object of the present invention to provide an asynchronous bidirectional network interface enabling seamless concurrent processing in a distributed heterogeneous processing system. In accord therewith, applications layer means are disclosed for enabling one task asynchronous to one process run by one processor of one kind to use another task asynchronous to another process run by another processor of another kind in such a way that the use of the used processor is transparent to the using processor as if the distributed processors were seamless. In further accord therewith, presentation layer means cooperative with the applications layer means are disclosed for converting data from the kind of data of the one processor whose process is to use the other process to another kind of data corresponding to the other processor whose process is being used and for determining which of plural, predetermined ways the used process is to be used. In further accord therewith, a session layer means cooperative with both the applications layer means and the presentation layer means are disclosed for providing a network virtual circuit between sockets associated with the processes borne by the distributed processors and for providing sending and receiving tasks along the network virtual circuit defined between the sockets of the several processes. In further accord therewith, transport layer means cooperative with the session layer means are disclosed for providing data reads and data writes of data-converted and usage-determined information along the network in accord with the sending and receiving tasks defined between the sockets of the network virtual circuit. In this manner, the asynchronous bidirectional network interface enabling seamless concurrent processing in a distributed heterogeneous processing system of the present invention is able to be implemented using the compilers and network protocols and programming languages, such as the Ada programming language, that are readily available today without the need to re-design a compiler to support multiple heterogeneous processors with all its attendant disadvantages. The network interface of the invention enables asynchronous bidirectional multiple-message passing in each of the tightly-coupled, moderately-coupled and loosely-coupled architecture conformance types.

DETAILED DESCRIPTION OF THE PREFERRED EMBODIMENTS

Figure 1:
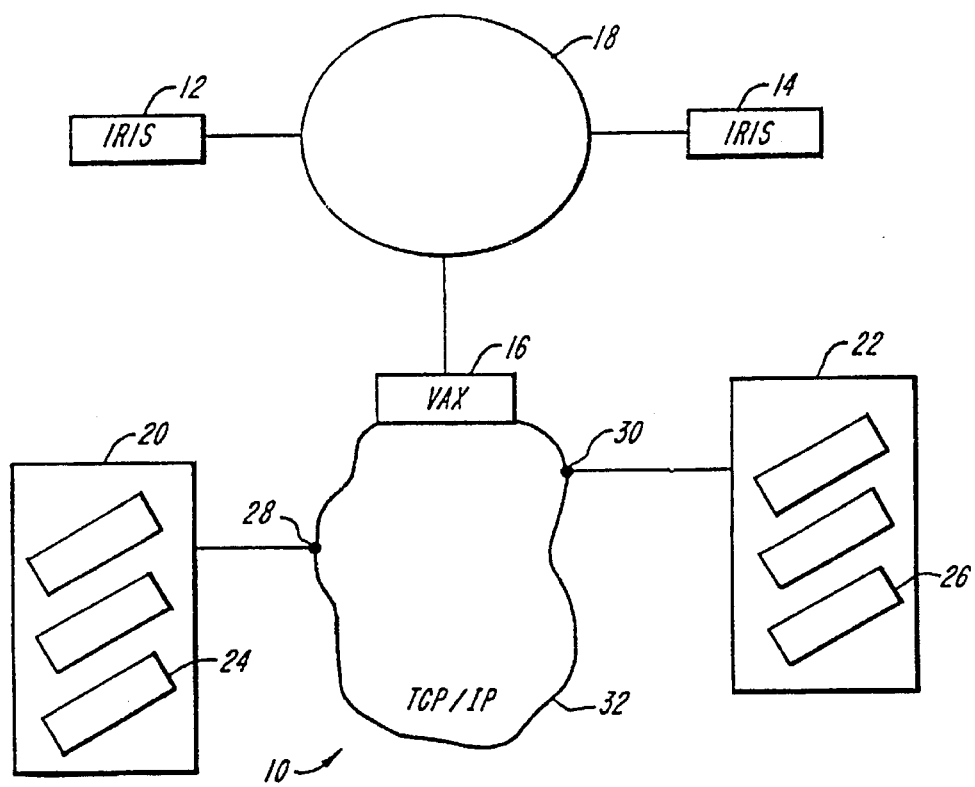
FIG. 1 is a system diagram of the asynchronous bidirectional interface enabling seamless concurrent processing in a distributed heterogeneous processing system in accord with the invention.

Referring now to FIG. 1, generally designated at 10 is a system diagram of the novel asynchronous bidirectional network interface enabling seamless (i.e., as though run by a unitary, undistributed application program) concurrent processing in a distributed heterogeneous processing system in accord with the instant invention. The interface 10 is implemented in a distributed heterogeneous multiprocessing system illustrated by three processors 12, 14, and 16 that differ in respect of one or more of, among other things, instruction set and data representation. The processors 12, 14, 16 in the illustrated embodiment are Iris workstations 12, 14, and a VAX machine 16. The heterogeneous processors 12, 14, and 16 may be arranged in any one of three architecture conformance types, namely, the tightly-coupled, moderately-coupled, and loosely-coupled types as described above in the description of the prior art, and in the illustrated embodiment, the processors 12, 14, and 16 are connected over a local area network (LAN) 18, such as an Ethernet, in a loosely-coupled architecture conformance type.

Bidirectional asynchronous communication between each of the processors 12, 14, 16 with any of the processors 12, 14, 16 over the communications medium 18 is implemented by a network interface defined by one of the multiprocessors, the VAX machine 16 in the illustrated embodiment. Two such distributed processes are illustrated schematically by rectangles 20, 22, that are respectively borne by any two processors of the distributed multiprocessing system. Each of the processes 20, 22 include concurrent tasks illustrated schematically by parallelograms 24, 26, that may be asynchronous to the corresponding processes 20, 22, especially send and receive tasks described hereinbelow, that are asynchronous thereto.

Each of the several "Program Asynchronous/Task-Synchronous (PA/TS)" concurrent tasks 24, 26 of the processes 20, 22 are located at different nodes defined between their corresponding processors 12, 14, 16 along the communication interface 18, and are interconnected by sockets schematically illustrated by dots 28, 30 defined by a network virtual circuit to be described illustrated by loop 32. In the illustrated embodiment, the network virtual circuit 32 is implemented by the so-called Transmission Control Protocal/Internet Protocal (TCP/IP), although another suitable mechanisms to communicate between processors, which establish preselected protocols selected to allow action synchronization and data communication, may be implemented as well without departing from the inventive concept.

By virtue of the network virtual connection defined between the sockets 28, 30 on the virtual circuit 32, any task 24 of any process 20 at any node may exchange data and control information with any task 26 of any process 22 at any other node via the network virtual circuit 32 defined by the corresponding sockets 28, 30 asynchronously bidirectionally without regard to any differences in the corresponding processors and in such a way that any one of plural usage types may be implemented over the same network virtual circuit. Communication between the processes of the distributed heterogeneous processors on the network is effected by the network interface of the invention in such manner that the communicating processes thereof appear to each other as if the distributed network were seamless.

Figure 2:
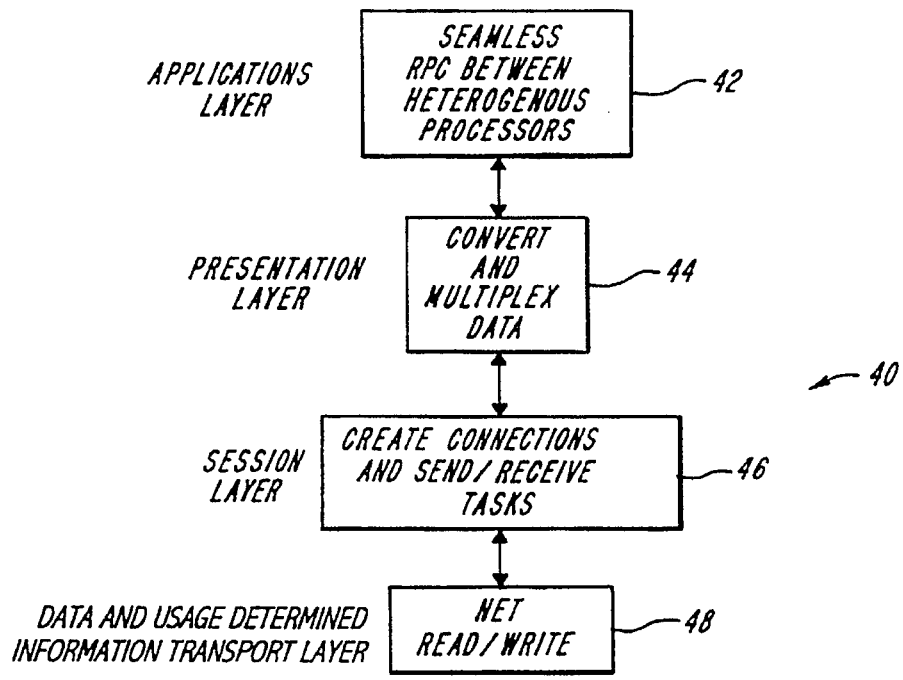
FIG. 2 is a diagram illustrating the structure of the network interface in accord with the present invention.

Referring now to FIG. 2, generally designated at 40 is a diagram illustrating the layers of the network interface in accord with the present invention. An cross-processor-tasking-of-application-program-components-layer-means 42 (or simply applications layer) is provided that is concerned with an exemplary high-level seamless Remote Procedure Call (RPC) to be described between heterogeneous processors at any pair of nodes. The exemplary high-level RPC of the applications layer 42 enables any task of any process at any node to call any task of another process at another node of any other processor, whether of the same or different type as the calling processor, in such fashion that the called task appears to locally reside at the processor calling the process at the other node in a seamless manner. Exemplary ways that one process may differ from another process on heterogeneous processors include the different ways that data may be represented, as for example, strings, integers, floating point numbers, as so on. Any differentiation between processors that may be of heterogeneous data types is made transparent to the calling process, preferably by converting the data to the format of the called process, although other harmonization methods, such as conversion to a universal format, may be employed as well. Conversion of the data is implemented by a presentation-layer-means 44 (or simply presentation layer) in a manner to be described that makes the underlying differences in data representation appear invisible to the applications layer 42.

Along any virtual circuit defined between sockets by pairs of cooperating processes borne by the same or heterogeneous processors at different nodes of a distributed multiprocessing system of any of the three architecture conformance types described above, which virtual circuit is preferably though not necessarily a stream-orientated pipe used for communication, the presentation layer 44 enables to provide any selected one of plural predetermined message types. Multiplexing of different message types over the same virtual circuit is preferably implemented in a manner to be described by coding network messages as variant record types, that is, as records with discriminants, where the discriminant describes the type of and length of message, and the corresponding portion contains the information for that message kind, although other mechanisms to distinguish message types and size, whether explicitly or implicitly, may be employed as well without departing from the inventive concept.

A session layer 46 (or connections-and-task-transport-layer-means) is provided to create virtual circuit connections to be described between asynchronous tasks of cooperating processes by defining sockets at the nodes where the corresponding processors of the distributed network are located. The virtual circuits created between peer communicating entities allow program asynchronous task synchronous multiple concurrent tasks to run without blocking the overall processes at either ends of any network virtual circuit. Program asynchronous task synchronous send and receive tasks to be described are implemented by the session layer 46 which enable data and control information to be exchanged between tasks of peer processes interconnected by virtual circuits distributed at different nodes of any of the multiprocessor architecture conformance types.

A data-and-usage-determined-information-transport-layer-means 48 (or simply transport layer) is provided to implement reliable end-to-end transport of messages by means of network primitives to be described including read and write primitives to be described. The network read and write primitives enable an underlying network layer, not shown, to receive information to be sent to its destination and to accept information in the correct order therefrom at the destination to form the original message. Any suitable data link layer and physical layer, not shown, that, on the one hand, makes the physical layer appear free of transmission errors to the network layer, and on the other hand, provides the physical transmission of raw bits, may be employed.

Figure 3:
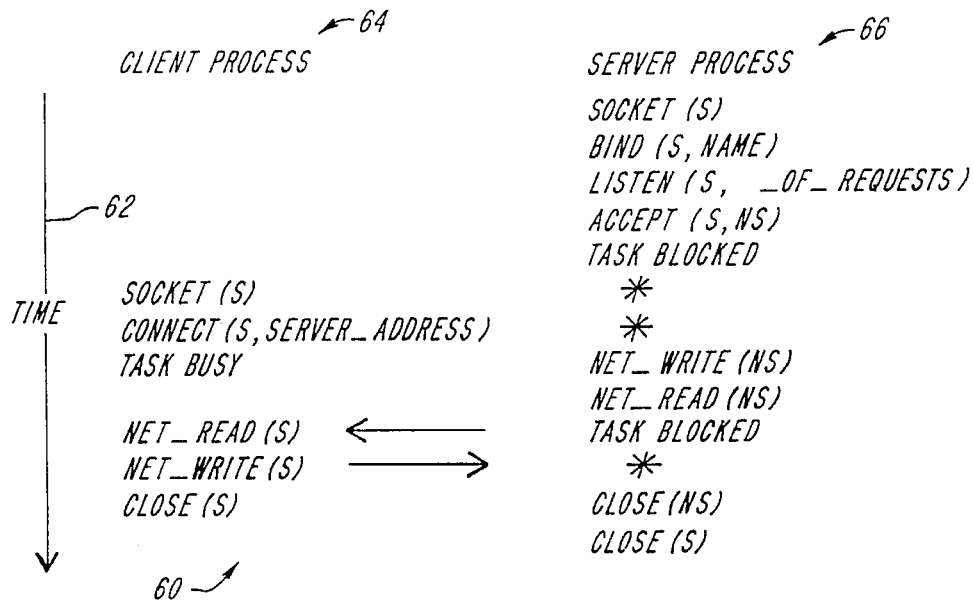
FIG. 3 is a diagram illustrating portions of the session layer and transport layer of the network interface in accord with the invention.

Referring now to FIG. 3 generally designated at 60 is a diagram illustrating the virtual network connection protocol of the session layer 46 (FIG. 2), wherein time is represented by vertical arrow 62, a process having a calling task is illustrated by left hand column generally designated 64 marked "client process" and a process having a called task is illustrated by right hand column generally designated 66 marked "server process". The primitives contained in the VAX-based network interface are hereinafter briefly described, along with their exemplary Ada interface. The primitives represent a subset of all primitives available in most implementations of TCP/IP that constitute virtual circuit capabilities.

```
SOCKET              This procedure is used to create a socket which is an end point
                    for communication.
procedure SOCKET (
    S               :       out  integer;       --socket
    DOMAIN          :       in   integer;       --communications domain
    S_TYPE          :       in   integer;       --communication semantics
    PROTOCOL        :       in   integer);      --specifies a particular protocol
BIND                This procedure is called after a socket has been created. Bind
                    assigns a port name or number to be used as a reference by other
                    processes on the network.
procedure BIND (
    STATUS          :       out  integer;       --return status
    S               :       in   integer;       --socket
    NAME            :       in   SOCKADDRS;     --name to assign to socket
    NAMELEN         :       in   integer);      --length of name
CONNECT             This procedure is called by a process to establish a connection to a
                    remote process. The node name and the port name or number
                    used in the Bind call by the remote process is used in this call.
procedure CONNECT (
    STATUS          :       out  integer;       --return status
    S               :       in   integer;       --socket
    NAME            :       in   SOCKADDRS;     --remote socket name
    NAMELEN         :       in   integer);      --length of name
LISTEN              This procedure determines the allowable backlog of incoming
                    connection requests.
procedure LISTEN (
    STATUS          :       out  integer;       --return status
```

| | | | |
|---|---|---|---|
| S | : in | integer; | --socket |
| BACKLOG | : in | integer); | --max length of queue of pending --connections |
| Netclose | This procedure is used to close a socket and end the communication session. | | |
| procedure NETCLOSE ( | | | |
| S | : in | integer); | --socket |
| Netread | This procedure is used to read messages from a socket that has been connected to another. | | |
| procedure NETREAD ( | | | |
| CC | : | out integer; | --return length |
| S | : in | integer; | --socket |
| BUF | : in | SYSTEM.address; | --buffer address |
| NBYTES | : in | integer); | --buffer length |
| Netread_Buffered | This procedure is used to buffer up successive Netread's to result in a message of a user specified length. A producer process may send a message of greater length than that which is received by Netread. Therefore, multiple Netread's must be performed by the consumer process. This procedure hides the details of this operation. | | |
| procedure NETREAD_BUFFERED ( | | | |
| CC | : | out integer; | --return length |
| S | : in | integer; | --socket |
| BUF | : in | SYSTEM.address; | --buffer address |
| NBYTES | : in | integer); | --buffer length |
| Netwrite | This procedure sends a message on the specified socket. | | |
| procedure NETWRITE ( | | | |
| CC | : | out integer; | --return length |
| S | : in | integer; | --socket |
| BUF | : in | SYSTEM.address; | --buffer address |
| NBYTES | : in | integer); | --buffer length |
| Rhost | This procedure is used to look up an Internet host by name and return a 32-bit Internet address. | | |
| procedure RHOST ( | | | |
| IADDR | : | out integer; | --32-bit internet address |
| ANAME | : in | out string); | --host name |
| TCP_Accept | This procedure is used to accept inbound connection requests from a socket. It returns a new socket to be used in communicating to the requesting process. | | |
| procedure TCP-ACCEPT ( | | | |
| NS | : | out integer; | --new socket returned |
| S | : in | integer; | --socket |
| ADDR | : | out SOCKADDRS; | --address of the connecting entity |
| ADDRLEN | : | out integer); | --length of address returned |
| Put_Bin | Two overloaded procedures are used to print the binary values of integers or 32 bit array types to the screen. These procedures are predominantly used for debugging. | | |
| procedure PUT_BIN ( | | | |
| BUFFER | : in | integer); | |
| procedure PUT_BIN ( | | | |
| BUFFER | : in | SYSTEM.BIT_ARRAY_32); | |
| Htons | This function converts the host byte ordering to network byte ordering for a two byte word. | | |
| function HTONS (BUFFER : in short_integer) | | | |
| return short_integer; | | | |
| Htonl | This overloaded function converts the host byte ordering to network byte ordering for a four byte long word. | | |
| function HTONL (BUFFER : in integer) | | | |
| return integer; | | | |
| function HTONL (BUFFER : in SYTSTM.BIT_ARRAY_32) | | | |
| return SYSTEM.BIT_ARRAY_32; | | | |

To establish a network connection between two tasks on the network, on the one hand, the server process task 66 creates a TCP socket using the procedure SOCKET. This socket can be thought of as one end of a communication channel, much like a telephone. To enable other tasks on the network to connect to this socket, a task makes its socket known to the network by use of the procedure BIND. This procedure basically associates the socket with a port on the node in which the task resides, much like publishing one's telephone number. This task is referred to herein as the server. The server task specifies the size of the incoming request queue before a connection request can be accepted. This is accomplished through use of the procedure LISTEN. This determines the number of pending incoming connection requests allowed on the socket. The server task calls TCP_ACCEPT. This call blocks the task until an incoming connection request is initiated by a client for this known TCP port. This is analogous to a person waiting for the telephone to ring, but with a PATS implementation. When a request from a client task is received, a new socket (NS) is automatically returned from TCP_ACCEPT. This is analogous to a person answering the telephone. Bidirectional communication is now possible between the server and client tasks over the new socket. This is analogous to two persons holding a conversation over the telephone. This is accomplished through use of the procedures NETREAD, NETREAD_BUFFERED, and NETWRITE. The old socket still exists and can be used to accept inbound connection requests from other tasks. When termination of communication is desired, the procedure NETCLOSE is called to close the communications channel, much like hanging up the telephone.

On the other hand, the client task 64 also creates a TCP socket by calling SOCKET to establish its end of the communication channel. The client task 64 then requests a connection to an existing known TCP port by calling the procedure CONNECT. This is similar to dialing the telephone where the telephone number relates to the network node address and port number to the server task. If an unknown node address and port number is specified, an error condition is returned indicating that a time-out has occurred. When a successful connection is established, the client and server tasks are able to communicate with each other. The client like the server may call NETREAD, NETREAD_BUFFERED, and NETWRITE as if two people were having a conversation on the telephone. When termination of communication is desired, the procedure CLOSE is called to close the communications channel, much like hanging up the telephone.

Figure 4:
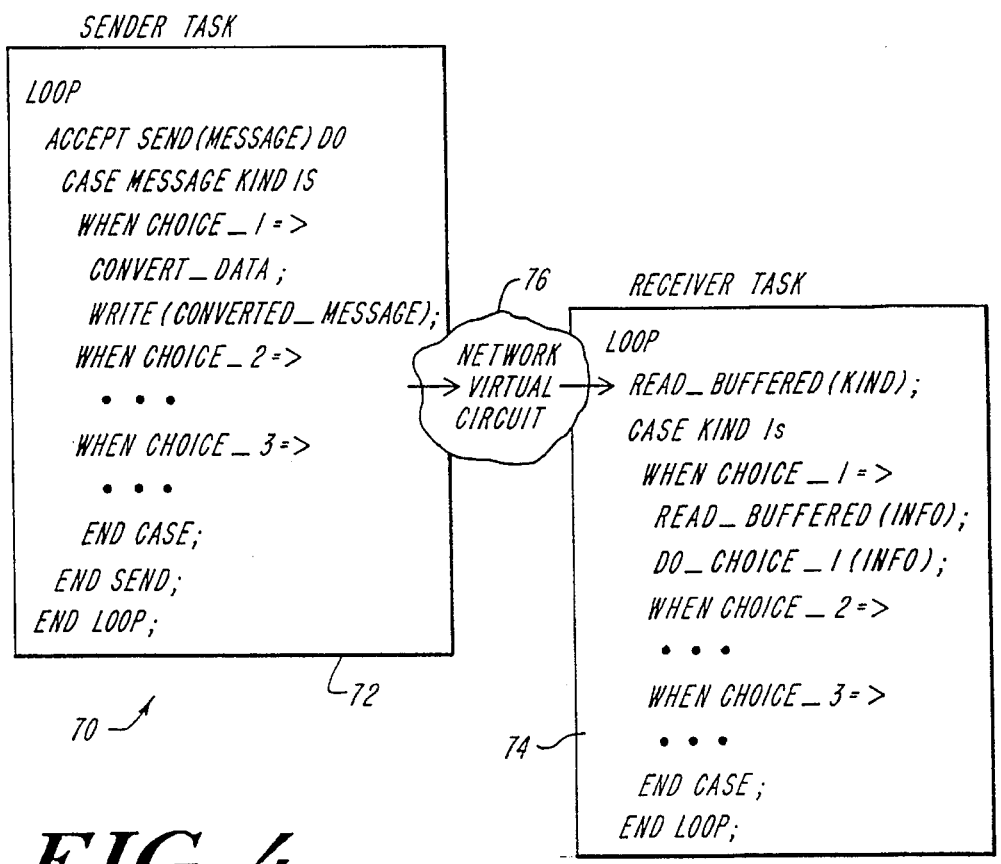
FIG. 4 is a diagram illustrating the presentation layer and session layer of the network interface in accord with the present invention.

Referring now to FIG. 4, generally designated at 70 is a diagram illustrating part of the session layer 46 (FIG. 2) as well as the presentation layer 44 (FIG. 2) whereby the cooperative send/receive tasks of peer communicating processes exchange control and data bidirectionally along the network virtual circuit are established therebetween. A sender task is illustrated by rectangle 72, and a receiver task is illustrated by rectangle 74. The sender and receiver tasks, concurrent tasks respectively constituting the connected processes, are interconnected via the network virtual circuit as schematically illustrated by region 76. Both the sender and receiver tasks 72, 74 communicate over the same network virtual circuit 76, the sender task to send messages to the receiver task, on either side of the virtual circuit 76.

Messages are coded in the exemplary embodiment as variant record types where the discriminant specifies the message type being sent or received as indicated previously. This makes it possible to invoke multiple types of actions in a remote process, such as an Ada program, over a single network circuit. Each cooperating network process residing within the software system would have both a sender task and a receiver task.

For the exemplary Ada sender and receiver tasks 72, 74, the sender task waits to rendezvous with the application when communication is desired. When the rendezvous occurs, the sender task determines the message kind. This allows the sender to implicitly determine the size of the message and the representation conversion to be performed on the message before transmitting to the remote process. Since the exemplary Ada attribute size will return the size of the largest variant of the network message, it is necessary for the programmer to maintain the size of each variant component of the message. This can be accomplished by use of a discriminator to specify a separate Ada type for each variant part (i.e., the instruction "type MESSAGEs (KIND-:KINDSs:=ALERT) is record" in the exemplary network message set forth below). The size attribute will return the correct length of the variant component type. This size plus the size of the discriminant itself determines the size of the entire message to be sent. The network primitive NETWRITE contains a parameter for specifying the length of the buffer to send. Specifying the actual length of the message, the size in bytes of the discriminant plus the size of the type of the information field, makes it possible to optimize the use of the network. Once the data representation is converted and the size is determined, the message is sent over the network to the receiver task. The sender task then loops around and waits for another request (rendezvous) from the application to send another message, thus repeating the above-described process.

Since the exemplary TCP circuits are stream-orientated pipes used for communication, the receiver task 74 operates a little differently. The receiver task 74 receives the discriminant from the network virtual circuit 76 using a call to NETREAD_BUFFERED specifying a message length which is the size of the discriminant of the message. This information determines the kind of message to follow and its implicit size. Once the kind of incoming message is determined, it is then possible for the receiver task to read the remaining portion of the message using NETREAD_BUFFERED, by specifying a message length which is the size of the type of the information field for the determined kind of message. The data representation is converted, as necessary, and the appropriate actions for the message received are executed. The receiver task then loops around to call NETREAD_BUFFERED, again specifying a message length that is the size of the discriminant, and repeats the above-described process.

Since network messages are coded as variant record types (records with discriminants) in the exemplary embodiment, the discriminant is used to describe the type of message, and the corresponding portion contains the information for that message kind. An example of a network message coded in Ada is shown below.

```
type KINDs is (ALERT, SIGNAL, A, B,C);
type ALERTs is
  record
    WHICH     : integer;
    ACTION    : ACTIONS;
  end record;
type SIGNALs is
  record
    WHICH     : integer;
    ACTION    : SIGNAL_ACTIONs;
  end record;
subtype As is integer;
subtype Bs is float;
subtype Cs is boolean;
type MESSAGEs (KIND : KINDs :=ALERT) is
  record
    case KIND is
      when ALERT   =>  ALERT_INFO   : ALERTs;
      when SIGNAL  =>  SIGNAL_INFO  : SIGNALs;
      when A       =>  A_INFO       : As;
      when B       =>  B_INFO       : Bs;
      when C       =>  C_INFO       : Cs;
    end case; -- KIND
  end record; -- MESSAGEs
--declare the actual network message object
NETWORK_MESSAGE : MESSAGEs;
```

Figure 5:
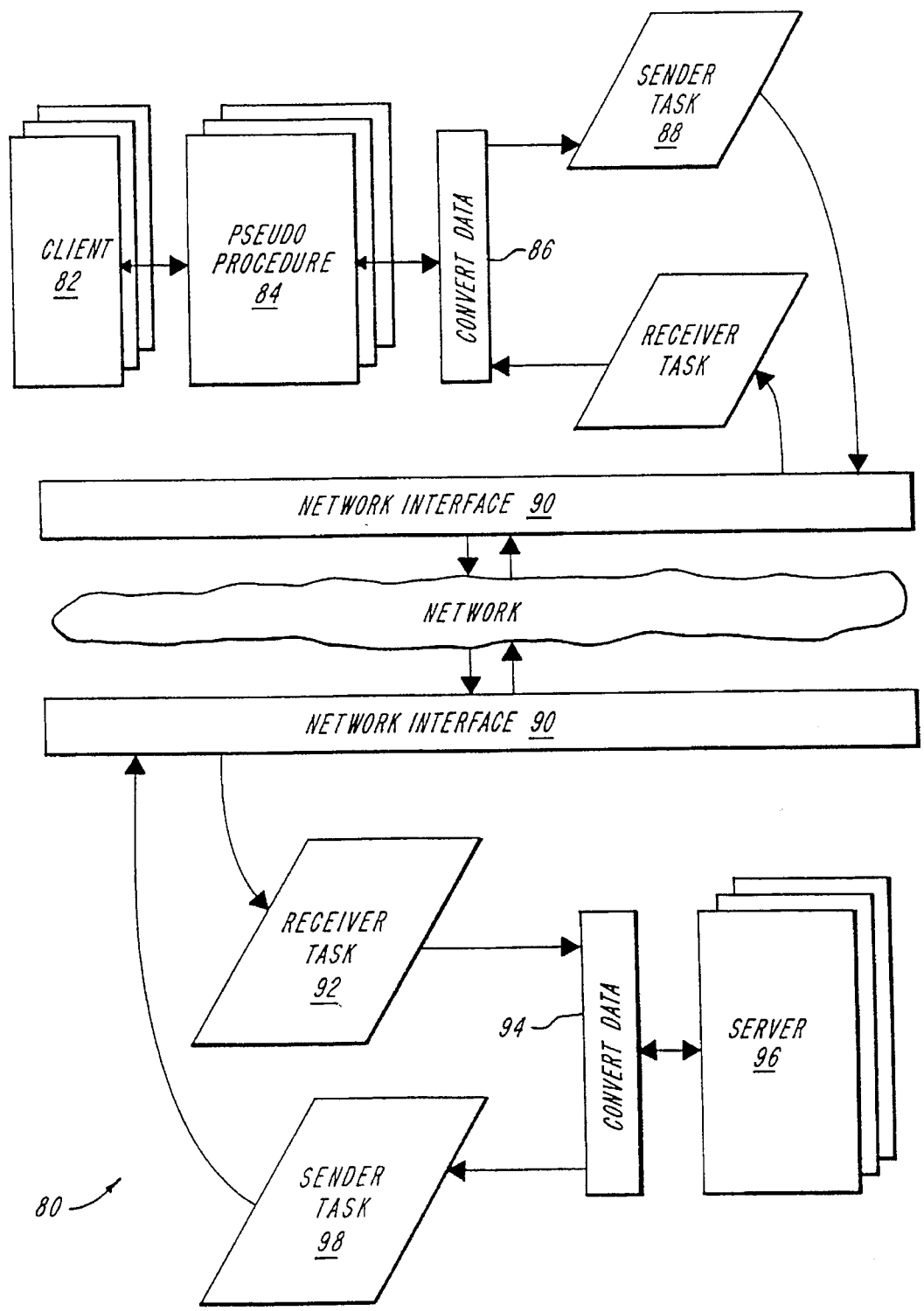
FIG. 5 is a diagram illustrating a remote procedure call between heterogeneous processors implemented by the network interface in accord with the instant invention.

Referring now to FIG. 5, generally designated at 80 is a diagram illustrating a seamless RPC in accord with the present invention. During the RPC, the client calls a local procedure to perform a service. The local procedure in turn calls another procedure to perform a service. The local procedure in turn calls another procedure which actually resides on another node of the network to perform the service required. The goal of RPC is to provide the services of a procedure to a client regardless of where the procedure actually resides. The procedure appears local to the client thus making the RPC mechanism transparent and apparently seamless.

A client 82 calls a local procedure which is labeled pseudoprocedure 84. This procedure can be, by way of example, an Ada subprogram (procedure or function) or an Ada task entry (which presents the same semantics as the procedure). The pseudoprocedure 84 assembles all of the parameters, if any into a message, an operation known as parameter marshalling. The data in the message is converted into a form that is usable by the remote system, as depicted by a convert data box 86. The message is then handed to a sender task 88, described hereinabove. The sender task 88 calls the facilities of the network interface to send the message to the remote system via a virtual circuit 32, described hereinabove.

The message is received by a receiver task 92 on the remote system through the facilities of the network interface. The receiver task 92 determines the message kind and thus, determines which of multiple actions needs to be performed, as described hereinabove. The data is converted, as necessary, by data converter 94 to a locally usable form. A remote procedure 96 is then called.

The receiver is able, due to the PATS mechanism described hereinabove, to continue to receive incoming messages while the RPC is being serviced. The remote procedure 96 can be, by way of example, an Ada subprogram or task entry just as the local procedure was. It is preferred in the exemplary embodiment to have a one-for-one match between pseudoprocedure and remote procedure type. Upon completion of the service, the return parameters are assembled into a message (parameter marshalling), which is sent back, via the sender task 98 on the remote system.

It is possible to have many simultaneous RPCs at various stages of completion in progress at any moment in time by any two systems connected via one or more network virtual circuits. This is depicted by the multiple copies of the client 82, pseudoprocedure 88, and remote procedure 96 boxes. A call can also be made by a client on either system to the server on the other.

Many modifications of the presently disclosed system will become apparent to those skilled in the art having benefitted from the disclosure of the instant invention.

What is claimed is:

1. For use in a multiprocessing system in which plural and heterogeneous processors perform distributed processing, a subsystem for interfacing component processes of application programs resident in different ones of the plural heterogeneous processors, which subsystem for interfacing asynchronously and bidirectionally enables processing in one and another of at least two heterogeneous processors of the plurality as though the distributed processing was performed under run control of a unitary, undistributed application program, said heterogeneous one and another processors differing by having at least one difference characteristic from among (A) plural, predetermined data representation format characteristics of the plural processors and (B) plural, predetermined different processor architecture characteristics dependent ways of using component processes of an application program, said plural processors being interconnected for multiprocessing by an interprocessor communication subsystem in which signals are borne by a hardware interconnection means, said subsystem for interfacing application program processes comprising:

cross-processor-tasking-of-application-program-components-layer-means residing in the application program level of software hierarchy coupled to a selected processor, which cross-processor-tasking-layer-means is operative to enable one task asynchronous to one component process run by one processor of one heterogeneous kind to use another component task asynchronous to another process run by another processor of another heterogeneous kind in such a way that the fact that the another task is being run by the another processor is transparent to the using processor as if the distributed processing is being performed under run control of a unitary, undistributed application program;

presentation-layer-means residing in the application program level of software hierarchy which is cooperative with the cross-process-tasking-of-application-program-components-layer-means for converting data from the data representation format characteristic of the one processor whose component process is to use the another component process to another data representation format characteristic corresponding to the another processor whose component process is being run thereby and for determining which of plural, predetermined ways the used component process is to be used;

connections-and-task-transport-layer-means in part residing in the application program level of software hierarchy and in part facilitated by the hardware interconnection means of the interprocessor communications subsystem, which connections-and-task-transport-layer-means is cooperative with both the cross-processor-tasking-of-application-program-components-layer-means and the presentation-layer-means for providing a network virtual circuit between sockets defined between the processes borne by the distributed processors and for providing sending and receiving tasks along the network virtual circuit between the sockets of the several processes thereof thereby facilitating execution of the component processor application programs resident in different and heterogeneous processors as though a unitary, undistributed application program were being executed, the hardware interconnection means providing the communication path facilitating unification of execution of the component processes in the separately resident application programs; and data-and-usage-determined-information-transport-layer-means resident in the application program level of software hierarchy cooperative with the connections-and-task-transport-layer-means for providing data reads and data writes of data representation-format-converted and usage-determined information along the network virtual circuit by the sending and receiving tasks between the sockets of the network virtual circuit.

2. The subsystem for interfacing component processes of application programs in accordance with claim 1, wherein said interprocessor communication subsystem is of the tightly-coupled distributed multiprocessor predetermined architecture conformance type; and said hardware interconnection means is a set of bus conductors interconnecting the plural processors with a globally shared memory.

3. The subsystem for interfacing component processes of application programs in accordance with claim 1, wherein said interprocessor communication subsystem is of the loosely-coupled distributed multiprocessor predetermined architecture conformance type; and said interprocessor communication subsystem is of the type employing a communication protocol which facilitates both data sharing and synchronization actions.

4. The subsystem for interfacing component processes of application programs in accordance with claim 1, wherein said interprocessor communications subsystem is of the loosely coupled distributed multiprocessor predetermined architecture conformance type; and said interprocessor communication subsystem comprises an area network including a signal transmission line and having a store-and-forward information transfer mechanism.

5. The subsystem for interfacing component processes application programs in accordance with claim 1, wherein said cross-processor-tasking-of-application-components-layer-means, which enables one task of one processor to use another task asynchronous to another process of another processor by means of a remote procedure call.

6. The subsystem for interfacing component processes of application programs in accordance with claim 1, wherein that particular function of the presentation-layer-means consisting of determining which one of said plural predetermined ways of using component processes of an application program is to be used, is performed by an included means for representing information to be transferred between processors in in response to both functional-message-kind and message-length such that particular functional-message-kinds and message-lengths enable the used process to be used in one of said predetermined ways along the same network virtual circuit.

7. The subsystem for interfacing component processes of application programs in accordance with claim 6, wherein said included means for representing information to be transferred between processors which represents said functional-message-kinds and said message-lengths is a single Ada computer language instruction of the Ada protocol discriminator type which will return the correct length of the variant component type, whereby the entire length of message to be sent may be determined as the length of the discriminator itself plus the returned length attribute.

8. The subsystem for interfacing component processes of application programs in accordance with of claim 1, wherein said connections-and-task-transport-layer-means providing said network virtual circuit between said sockets includes means for defining an input message queue at each of the processes borne by the processors at corresponding sockets.

9. The subsystem for interfacing component processes of programs in accordance with claim 1, wherein said connections-and-task-transport-layer-means providing said network virtual circuit between sockets further includes means for returning a new socket in response to receipt thereby of a request to use the component process that resides at the corresponding socket.

10. The subsystem for interfacing component processes of application programs in accordance with claim 1, wherein said sending and receiving tasks of said data-and-usage-determined-information-transport-layer means are asynchronous to the processes in which they are embedded.

11. The subsystem for interfacing components processes of application programs in accordance with claim 1, wherein the heterogeneous plural, predetermined data representation formal characteristics include one and another different numerical data representation formats respectively employing opposite byte orders.

12. The subsystem for interfacing component processes of application programs in accordance with claim 1 wherein said ways of using a component process of an application program of said heterogeneous one and the other processors differ at least in the processors' employment of different characteristic instruction sets in their execution of computer programs; and said presentation-layer-means determines the way of use of a used component process on the basis of the characteristic instruction set of the one processor whose component process is to use the other process relative to the characteristic instruction set of the other processor whose component process is being used.

13. The subsystem for interfacing component processes application programs in accordance with claim 3, wherein the communication conduit of a predetermined characteristic type is an area network loop employing the Transmission Control/Interest Protocol (TCP/IP) protocol for stream-oriented communication along signal pipes.

14. The subsystem for interfacing component processes of application programs in accordance with claim 4, wherein the communication conduit of a predetermined type is an area network loop employing the Transmission Control/Interest Protocol (TCP/IP) protocol for stream-oriented communication along signal pipes.

* * * * *